United States Patent Office 2,744,036
Patented May 1, 1956

2,744,036
COATED NICKEL WELDING ELECTRODE

George Raymond Pease, Scotch Plains, and Theodore Ephraim Kihlgren, Berkeley Heights, N. J., assignors to The International Nickel Company, Inc., New York, N. Y., a corporation of Delaware No Drawing. Application October 29, 1951, Serial No. 253,756

Claims priority, application Great Britain September 11, 1951

11 Claims. (Cl. 117—206)

The present invention relates to a coated welding electrode and more particularly to a flux-coated, arc-welding electrode especially adapted for the all-position, direct-current electric-arc fusion deposition of nickel on ferrous metal, on nickel-clad ferrous metal, and on nickel.

Heretofore, the art has employed various flux-coated, nickel-cored electrodes for welding nickel-clad ferrous metals and for overlaying ferrous metals with nickel. However, present day standards are such that arc welds and overlays which would have been acceptable in the past are not considered satisfactory today. Certain prior art electrodes can be employed to produce radiographically sound fusion deposits but these deposits lack the ductility necessary to meet the welding code requirements. Certain other prior art electrodes can be employed to produce ductile welds or overlays but, at the same time, these welds or overlays possess an objectionable degree of porosity. Furthermore, the slag deposited on welds or overlays made with prior art electrodes is usually very difficult to remove, thereby making cleaning costs commercially prohibitive. In some cases, adherent, residual, unremovable slag deposits deleteriously affect the corrosion resistance of the welds or overlays. Finally, most prior art electrodes possess the defect of poor operability in vertical and in overhead positions. Although attempts were made to overcome the foregoing difficulties and other difficulties, none, as far as we are aware, was entirely successful when carried into practice commercially on an industrial scale. The present invention overcomes all the disadvantages and difficulties encountered when employing prior art electrodes for the electric-art fusion deposition of nickel on nickel-clad ferrous metals or on ferrous metals. The fusion deposits obtained by employing the flux-coated electrode provided by the present invention are relatively insensitive to dilution by iron. Furthermore, the slagging characteristics of the flux coating of the present electrode are markedly superior to the slagging characteristics of prior art electrodes employed for the same purpose in that the slag produced on electric-arc fusion deposits when employing the present electrode possesses the unusual property of being easily removable from said deposits.

It has now been discovered that direct-current electric-arc fusion deposition of nickel on metal surfaces, such as direct-current arc welds on nickel-clad ferrous metals and overlays on ferrous metals, is remarkably improved by employing a coated electrode having a flux coating which introduces practically no carbon into the weld and having a special low-carbon, low-aluminum nickel core containing titanium and magnesium in amounts within critical ranges.

It is an object of the present invention to provide an improved coated nickel electrode eminently suitable for direct-current arc welding of nickel-clad ferrous metals and overlaying of ferrous metals.

Another object of the invention is to provide a special flux-coated nickel arc-welding electrode which does not introduce substantially any carbon into the weld of nickel-clad ferrous metals or into the overlay of nickel on ferrous metals and which produces an easily removable slag.

The invention also contemplates providing a coated electrode having a low-carbon nickel core containing critical amounts of titanium and magnesium and not more than a critical amount of aluminum.

It is a further object of the invention to provide a novel flux-coated nickel arc-welding electrode for producing welds and overlays having an exceptionally high order of weld ductility and marked freedom from porosity, particularly in iron-diluted welds and overlays.

The invention further contemplates a special coated nickel electrode to be employed for the direct-current arc-welding of nickel-clad ferrous metals and for overlaying ferrous metals which possesses improved arc stability and operability in all positions.

It is still another object of the present invention to provide ductile, porosity-free, electric-arc fusion deposits of nickel of nickel-clad ferrous metals and on ferrous metals which consistently possess markedly improved ductility and soundness.

Furthermore, the present invention provides a novel electrode having a flux coating which produces a slag on electric-arc fusion deposits made on nickel-clad ferrous metals and on ferrous metals possessing the characteristic of being easily removable from said deposits.

Other objects and advantages will become apparent from the following description of the invention.

The flux coating of the electrode provided by the present invention contains at least about 25% each of calcium carbonate and cryolite as the main ingredients. If either of these main ingredients is present in amounts less than 25% each, then the slag becomes so fluid as to be unmanageable and/or the soundness of the fusion deposit is adversely affected. The flux coating also contains a small but sufficient amount of bentonite and a sufficient amount of a binder material for the purpose of holding the coating in position on the electrode core. The preferred and more preferred ranges for the dry ingredients of the electrode coating are given in the following Table I:

TABLE I.—FLUX COATING

| Dry Flux Ingredients | Range, Percent by Weight | |
|---|---|---|
| | Preferred | More Preferred |
| Calcium Carbonate | 42 to 62 | 45 to 50. |
| Cryolite | 55 to 35 | 52 to 47. |
| Bentonite | 1 to 5 | 2 to 4. |

It is not necessary that all the fluoride content of the flux be present as cryolite provided at least about 25% cryolite is present. For example, up to about 10% calcium fluoride and/or up to about 10% sodium fluoride may also be present. However, the amounts of calcium fluoride and/or sodium fluoride each should not exceed about 10%, since the fusion-deposit soundness will suffer and/or the slag will not be easily removable.

The binder for the dry flux ingredients can be of any suitable kind, such as an aqueous solution of alkali metal silicate with or without a small amount of invert sugar. It is essential that the binder be of such a nature that practically no carbon or any other undesirable elements, such as sulfur, can be supplied to and incorporated in the fusion deposit. A suitable binder consists of an aqueous solution of sodium silicate with or without a small amount of invert sugar in the ranges given in the following Table II:

TABLE II.—FLUX BINDER

| Binder Ingredients | Percent by Wt. of Dry Flux Ingredients | |
|---|---|---|
| | Broad Range | Preferred Range |
| Sodium Silicate [1] | 5 to 30 | 10 to 20. |
| Invert Sugar [2] | up to 4 | 1 to 3. |

[1] 42.5° Bé. (Baumé) aqueous solution containing about 40% solids.
[2] 43° Bé. aqueous solution containing about 82% solids.

A convenient form of invert sugar is a 43° Bé. water solution thereof containing about 82% solids although other solutions of invert sugar of different concentrations can also be used. The presence of invert sugar in the binder mixture inhibits cracking of the flux coating as it is dried on the core. Invert sugar in the foregoing amounts is not suffiicent, nor is the carbon contained therein in such a form, that carbon can be transferred to and incorporated in the fusion deposits.

The flux coating is prepared by mixing the dry ingredients in amounts within the aforesaid ranges and then adding the binder ingredients in the aforesaid amounts plus sufficient water to form a paste. One way of applying the flux coating to the core is by extrusion. Another method of applying the flux to the special core is by dipping. After the pasty flux of proper thickness is adhering to the core, the composite electrode is dried at about 500° F. to 600° F. for at least one hour, preferably about one to about three hours. Examples of typical core diameter-flux thickness relationships are given in the following Table III:

TABLE III

| Core Diameter, Inches | Flux Thickness, Inches | Electrode Diameter, Inches |
|---|---|---|
| 0.093 | 0.0385 | 0.170 |
| 0.125 | 0.0275 | 0.180 |
| 0.156 | 0.0270 | 0.210 |
| 0.187 | 0.0265 | 0.240 |

However, the thickness of the flux coating can be varied considerably, e.g., 0.01 inch less or 0.02 inch more than given in Table III, and eminently superior fusion-deposit properties are still obtained. In other words, determination of adequate coating thickness for the present coated electrodes is within the skill of the art and anyone so skilled can ascertain the proper relationship of core diameter to flux coating thickness necessary to obtain the results provided by the present invention.

Broadly speaking, the core of the novel electrode provided by the present invention contains mainly nickel together with critical amounts of titanium and magnesium. In addition, the core can also contain small amounts of carbon and aluminum not exceeding certain critical values. The present electrode produces welds on nickel-clad ferrous metals or overlays directly on ferrous metals which are not only sound and ductile but which also possess easily removable slags. It is only by controlling the amounts of titanium and magnesium within critical ranges and by not permitting the carbon and and aluminum contents to exceed critical amounts that the unexpected combination of improved fusion-deposit properties is obtained. The composition of the core must fall within the broad range given in following Table IV which also presents a preferred range of composition:

TABLE IV.—CORE COMPOSITION PER CENT BY WEIGHT

| Element | Broad Range | Preferred Range |
|---|---|---|
| Titanium | 3.5 to 5 | 3.75 to 4.75. |
| Magnesium | 0.03 to 0.35 | 0.07 to 0.15. |
| Aluminum | up to 0.75 | 0.3 to 0.6. |
| Carbon | up to 0.1 | up to 0.05. |
| Nickel [1] | balance | balance. |

[1] Balance nickel also includes incidental amounts of associated cobalt plus any residual deoxidizers, e. g., silicon, and/or small amounts of retained impurities, such as iron, copper, etc.

Fusion deposits made on nickel-clad ferrous metals or on ferrous metals when employing the present electrode are usually diluted with iron, the amount of iron varying from practically nil to as high as about 35% by weight. In addition, such fusion deposits will also contain about 1.2% to about 3.5% by weight titanium, about 0.007% to about 0.02% by weight magnesium, up to about 0.5% by weight aluminum, up to about 0.1% by weight carbon, the balance being substantially nickel. These deposits are characterized by exceptionally high ductility and marked freedom from porosity coupled with easy removability of slag as compared to fusion deposits made on similar materials with prior art electrodes. Present day commercial applications for nickel welds in nickel-clad steels or nickel overlays on steel require that such welds or overlays possess at least about 25% elongation in ductility tests. It has been found that, to meet any given ductility requirement, the minimum required magnesium and the maximum permissible aluminum in the core composition vary inversely as the iron content, i. e., iron dilution, of the fusion deposit.

For the purpose of giving those skilled in the art a better understanding of the invention and a better appreciation of the marked advantages obtained by employing the new electrode for welding nickel-clad ferrous metals, e. g., nickel-clad iron and steel, and for overlaying ferrous metals, the following examples are given to illustrate the critical effects of titanium, magnesium, aluminum and carbon in the present electrode. The data presented in Examples II, III and IV were obtained from fusion deposits made on nickel-clad steel specimens, in which 3 inch wide by 6 inch long by ⅜ inch thick steel plates were each clad on one side with two ⅛ inch thick nickel plates spaced ¾ inch apart. The ¾ inch gaps were then filled with fusion deposits by the same direct-current, electric-arc technique. The data presented in Example I were obtained by testing ⅜ inch thick nickel-clad steel specimens having a 20% (0.075 inch thick) nickel cladding. ¼ inch wide grooves ⅛ inch deep in the nickel-clad surfaces of the specimens were filled with fusion deposits by the same welding technique employed in Examples II, III and IV. Electrodes having varying composition of core but the same compositions of flux coating, i. e., about 47% calcium carbonate, about 50% cryolite and about 3% bentonite together with a binder consisting of about 15% sodium silicate (42.5° Bé. aqueous solution) and about 2% invert sugar (43° Bé. aqueous solution) by weight of the dry ingredients, were employed in determining the test data of Examples I, II and III. Electrodes having the same core composition but having flux coating compositions differing in carbon contents were employed in the tests set forth in Example IV.

*Example I*

To illustrate the critical effect of titanium on the soundness of fusion deposits, tests were made on the aforedescribed nickel-clad steel specimens employing electrodes having varying titanium contents. The data obtained are presented in following Table V:

TABLE V.—EFFECT OF TITANIUM

| Test No. | Core, Percent by Weight | | | | Fusion Deposit | | | | Soundness of Deposit |
|---|---|---|---|---|---|---|---|---|---|
| | | | | | Percent by Weight | | | | |
| | Ti | Mg | Al | C | Ti | Al | C | Fe | |
| 1 | 0.5 | 0.08 | 0.10 | 0.08 | 0.06 | [1]<0.1 | 0.07 | 7 | very porous. |
| 2 | 1.0 | 0.08 | 0.35 | 0.12 | 0.15 | 0.15 | 0.10 | 7 | Do. |
| 3 | 1.9 | 0.07 | 0.53 | 0.04 | 0.81 | 0.20 | 0.04 | 7 | Do. |
| 4 | 2.9 | 0.021 | 0.86 | 0.07 | 1.52 | 0.30 | 0.06 | 7 | some porosity. |
| 5 | 3.8 | 0.074 | [1]<0.1 | 0.04 | 1.9 | [1]<0.1 | 0.04 | 10 | no porosity. |
| 6 | 4.5 | 0.077 | 0.53 | 0.03 | 2.59 | 0.22 | 0.03 | 11 | Do. |

[1] The symbol "<" means "less than."

It is to be observed that only those electrodes, i. e., Test Nos. 5 and 6, containing titanium in amounts within the range contemplated by the present invention provide iron-diluted electric-arc fusion deposits possessing the excellent degree of soundness required by the present invention. Employing coated electrodes having cores containing less than about 3.5% titanium produces fusion deposits which are unsatisfactory from the viewpoint of soundness. This fact is clearly confirmed by comparing the data of Test Nos. 1 to 4 with the data of Test Nos. 5 and 6. On the other hand, electrodes having cores containing more than about 5% titanium tend to exhibit decreased arc-stability and, furthermore, are more costly and difficult to produce, e. g., more difficult from the viewpoint of forgeability, etc., during manufacture.

*Example II*

To demonstrate the criticality of the magnesium content of the present electrodes and to show the influence of iron dilution on the fusion-deposit ductility at low magnesium levels, several tests were made in which the magnesium contents of the electrode cores were varied. The data are given in following Table VI:

TABLE VI.—EFFECT OF MAGNESIUM

| Test No. | Core, Percent by Weight | | | | Fusion Deposit | | | | | Ductility (½"), Percent Elongation |
|---|---|---|---|---|---|---|---|---|---|---|
| | | | | | Percent by Weight | | | | | |
| | Mg | Ti | Al | C | Mg | Ti | Al | C | Fe | |
| 7 | 0.012 | 4.52 | 0.43 | 0.03 | [1]<0.005 | 2.44 | 0.18 | 0.05 | 10 | 26 |
| 8 | 0.023 | 3.50 | 0.08 | 0.04 | 0.007 | 1.19 | 0.03 | 0.06 | 10 | 20 |
| 9 | 0.14 | 4.43 | 0.43 | 0.03 | 0.015 | 2.23 | 0.16 | 0.04 | 10 | 50 |
| 10 | 0.28 | 4.69 | 0.52 | 0.02 | [2]0.03 | [2]2.3 | [2]0.2 | [2]0.04 | 10 | 62 |
| 11 | 0.012 | 4.52 | 0.43 | 0.03 | [1]<0.005 | 2.95 | 0.23 | 0.05 | 17 | 38 |
| 12 | 0.14 | 4.43 | 0.43 | 0.03 | 0.020 | 2.14 | 0.20 | 0.06 | 18 | 40 |
| 13 | 0.28 | 4.69 | 0.52 | 0.02 | [2]0.03 | [2]2.5 | [2]0.2 | [2]0.06 | 18 | 53 |

[1] The symbol "<" means "less than."
[2] Estimated values.

From an examination of the foregoing data it is seen that electrodes containing less than about 0.03% magnesium in the core, all other elements being within the ranges contemplated by the present invention, produce fusion deposits having relatively low ductility particularly if the iron content of the fusion deposit is relatively low. The data for Test Nos. 7 and 8 show that, at low magnesium levels in the cores, e. g., below 0.03% magnesium, and where the iron dilution of the fusion deposits is relatively low, e. g., of the order of 10% or less, the results are uncertain due to variations in welding technique, the recovery of important elements, such as magnesium and titanium, in the fusion deposits, etc. At higher core magnesium levels above about 0.03% magnesium, considerable variations in operating skill, recovery of important elements, etc., can be tolerated and still excellent results can be obtained. The present invention contemplates electrodes in which the core magnesium does not exceed about 0.35% maximum since magnesium contents in excess of this amount create fabrication difficulties, e. g., hot shortness, and consequently for this reason magnesium contents above about 0.35% are to be avoided in producing the electrode cores provided by the present invention.

*Example III*

The data presented in following Table VII were obtained from tests employing electrodes having varying aluminum contents, all other elements being within the scope of the present invention, in order to demonstrate the effect of aluminum on the ductility of fusion deposits having varying degrees of iron dilution.

TABLE VII.—EFFECT OF ALUMINUM

| Test No. | Core, Percent by Weight | | | | Fusion Deposit | | | | Ductility, Percent Elongation (½") |
|---|---|---|---|---|---|---|---|---|---|
| | | | | | Percent by Weight | | | | |
| | Al | Ti | Mg | C | Al | Ti | C | Fe | |
| 14 | [1]<0.1 | 3.8 | 0.074 | .04 | [1]<0.1 | 1.9 | 0.04 | 10 | 52 |
| 15 | 0.28 | 4.5 | 0.082 | .05 | 0.15 | 2.2 | 0.05 | 11 | 54 |
| 16 | 0.28 | 4.5 | 0.082 | .05 | 0.15 | 2.3 | 0.05 | 22 | 44 |
| 17 | 0.53 | 4.5 | 0.077 | .03 | 0.22 | 2.6 | 0.03 | 11 | 40 |
| 18 | 0.53 | 4.5 | 0.077 | .03 | 0.22 | 2.4 | 0.03 | 21 | 36 |
| 19 | 0.75 | 4.3 | 0.068 | .03 | 0.29 | 2.7 | 0.03 | 9 | 36 |
| 20 | 0.75 | 4.3 | 0.068 | .03 | 0.30 | 2.5 | 0.03 | 20 | 28 |
| 21 | 1.23 | 3.9 | 0.036 | .04 | 0.40 | 2.0 | 0.03 | 10 | 24 |
| 22 | 1.41 | 4.7 | 0.074 | .05 | 0.45 | 2.5 | 0.03 | 10 | 22 |

[1] The symbol "<" means "less than."

The foregoing data clearly confirm the fact that to obtain about 25% elongation or better in fusion deposits, the aluminum content of the present electrode core must not exceed about 0.75%. The lower the aluminum content, the greater is the ductility of the fusion deposit, particularly when such a deposit is diluted with iron. However, a small amount of aluminum, i. e., about 0.3%, has a beneficial effect on the operability of the electrode, quietness of arc and slag properties. Accordingly, for certain applications it may be desirable to compromise to a slight degree on ductility, e. g., by permitting about 0.3% to about 0.6% aluminum in the core wire, in order to obtain these other benefits.

*Example IV*

Following Table VIII presents data illustrating the effect of carbon on the ductility of fusion deposits of different iron contents. The electrodes employed in obtaining the following data contained titanium, magnesium and aluminum, all within the ranges contemplated by the present invention. Variations in "available" carbon in the electrodes were accomplished by adding different amounts of graphite to the flux coating.

TABLE VIII.—EFFECT OF CARBON

| Test No. | Core, Percent by Weight | | | | Percent Graphite [1] | Fusion Deposit | | | | Ductility, Percent Elongation (½") |
|---|---|---|---|---|---|---|---|---|---|---|
| | | | | | | Percent by Weight | | | | |
| | Ti | Mg | Al | C | | Ti | Al | C | Fe | |
| 23 | 4.5 | 0.082 | 0.28 | 0.03 | nil | 2.2 | 0.15 | 0.05 | 11 | 54 |
| 16 | 4.5 | 0.082 | 0.28 | 0.05 | nil | 2.3 | 0.15 | 0.05 | 22 | 44 |
| 24 | 4.5 | 0.082 | 0.28 | 0.03 | 0.1 | 2.0 | 0.14 | 0.06 | 20 | 48 |
| 25 | 4.5 | 0.082 | 0.28 | 0.03 | 0.5 | 2.0 | 0.14 | 0.09 | 20 | 38 |
| 26 | 4.5 | 0.082 | 0.28 | 0.03 | 1 | 2.1 | 0.13 | 0.15 | 20 | 26 |
| 27 | 4.5 | 0.082 | 0.28 | 0.03 | 2 | 2.2 | 0.14 | 0.23 | 19 | 20 |
| 28 | 4.5 | 0.082 | 0.28 | 0.03 | 3 | 2.3 | 0.15 | 0.32 | 17 | 20 |

[1] Carbon added as free graphite to the flux.

The data in Table VIII clearly show the effect of carbon on the properties of fusion deposits, the variations in carbon content being obtained by increasing additions of graphite to the flux coating of the electrodes. It is apparent from these data that the fusion deposit ductility is adversely affected by increasing fusion deposit carbon contents. At higher core aluminum levels, e. g., of the order of 0.75% aluminum, the ductility of the various fusion deposits would be lower than those shown in Table VIII. For this reason, the flux coating must be as free from "available" carbon as practicable and the electrode core must not contain more than about 0.1% carbon, preferably not more than about 0.05% carbon, in order that the carbon content of the fusion deposit not exceed about 0.1%.

The coated electrode of the present invention is particularly applicable to the all-position, direct-current arc-welding of nickel-clad ferrous metals and to the overlaying of ferrous metals with nickel and is markedly superior from the viewpoint of operability and fusion-deposit properties to prior art nickle-cored, flux-coated electrodes now employed for the same purposes.

It is to be observed that the present invention provides a unique, flux-coated arc-welding electrode, containing a nickel alloy core of critical composition, for producing improved, sound, ductile welds on nickel-clad ferrous metals and overlays on ferrous metals together with an easily removable slag on said welds and overlays.

Furthermore, the present invention provides the art with a new alloy composition of electrode core which, when coated with the particular flux contemplated by the present invention, produces electric-arc fusion deposits on nickel-clad ferrous metals and on ferrous metals which possess unexpectedly improved ductility as compared to fusion deposits made by employing prior art electrodes for the same purpose. While it is not the intent of the present invention to exclude the use of the present electrode for welding solid nickel, an outstanding advantage obtained by employing the present electrode is the ability to produce fusion deposits which are relatively insensitive to iron contamination or dilution as compared to prior art electrodes employed for the same purposes.

It is to be noted that the present invention is not to be confused with weld rods and fluxes employed for the flame deposition of nickel and nickel-base alloys on clad metals or on homogenous metals.

The present application is a continuation-in-part of our copending prior application Serial No. 187,354, filed September 28, 1950, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A coated arc-welding electrode comprising a core containing about 3.75% to about 4.75% titanium, about 0.07% to about 0.15% magnesium, about 0.3% to about 0.6% aluminum, up to about 0.05% carbon and the balance essentially nickel; and a flux coating covering said core containing a dry flux comprising essentially about 45% to about 50% calcium carbonate, about 52% to about 47% cryolite and about 2% to about 4% bentonite, and a binder for said dry flux in said flux coating comprising a baked mixture of sodium silicate in an amount equivalent to a 42.5° Bé. aqueous sodium silicate solution amounting to about 10% to about 20% by weight of said dry flux and invert sugar in an amount equivalent to a 43 Bé. aqueous invert sugar solution amounting to about 1% to about 3% by weight of said dry flux sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

2. A coated arc-welding electrode comprising a core containing about 3.75% to about 4.75% titanium, about 0.07% to about 0.15% magnesium, about 0.3% to about 0.6% aluminum, up to about 0.05% carbon and the balance essentially nickel; and a flux coating covering said core containing a dry flux comprising essentially about 42% to about 62% calcium carbonate, about 55% to about 35% cryolite and about 1% to about 5% bentonite, and a binder for said dry flux in said flux coating comprising a baked mixture of sodium silicate, in an amount equivalent to a 42.5° Bé. aqueous sodium silicate solution amounting to about 5% to about 30% by weight of said dry flux and invert sugar in an amount equivalent to a 43° Bé. aqueous invert sugar solution in an amount up to about 4% by weight of said dry flux sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

3. A coated arc-welding electrode comprising a core containing about 3.75% to about 4.75% titanium, about 0.07% to about 0.15% magnesium, about 0.3% to about 0.6% aluminum, up to about 0.05% carbon and the balance essentially nickel; and a flux coating covering said core containing a dry flux comprising at least about 25% calcium carbonate, at least about 25% cryolite, up to about 10% calcium fluoride, up to about 10% sodium fluoride and the balance essentially a small but sufficient amount of bentonite, and an amount of binder sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

4. A coated arc-welding electrode comprising a core containing about 3.75% to about 4.75% titanium, about 0.07% to about 0.15% magnesium, about 0.3% to about 0.6% aluminum, up to about 0.05% carbon and the balance essentially nickel; and a flux coating covering said core containing a dry flux comprising at least about 25% calcium carbonate, at least about 25% cryolite and the balance essentially a small but sufficient amount of bentonite, and an amount of binder sufficient to bind said dry flux as a flux coating on said core; said electrode, when used in the electric-arc fusion deposition of nickel on nickel-clad ferrous metals and on ferrous metals, being capable of providing improved operability and quietness of the arc and rendering the slag more easily removable as compared with a similar electrode not having aluminum in the core in the aforementioned range and said electrode also producing iron-containing fusion deposits possessing improved soundness and ductility.

5. A coated arc-welding electrode comprising a core containing about 3.75% to about 4.75% titanium, about 0.03% to about 0.35% magnesium, up to about 0.75% aluminum, up to about 0.1% carbon and the balance essentially nickel; and a flux coating covering said core containing a dry flux comprising at least about 25% calcium carbonate, at least about 25% cryolite and the balance essentially a small but sufficient amount of bentonite, and an amount of binder sufficient to bind said dry flux as a flux coating on said core; said electrode, when used in the electric-arc fusion deposition of nickel on nickel-clad ferrous metals and on ferrous metals, being capable of producing easily removable slags together with iron-containing fusion deposits possessing improved soundness and ductility.

6. A coated arc-welding electrode comprising a core containing about 3.5% to about 5% titanium, about 0.03% to about 0.35% magnesium, up to about 0.75% aluminum, up to about 0.1% carbon and the balance essentially nickel; and a flux coating covering said core containing a dry flux comprising essentially about 45% to about 50% calcium carbonate, about 52% to about 47% cryolite and about 2% to about 4% bentonite, and a binder for said dry flux in said flux coating comprising a baked mixture of sodium silicate in an amount equivalent to a 42.5° Bé. aqueous sodium silicate solution amounting to about 10% to about 20% by weight of said dry flux and invert sugar in an amount equivalent to a 43° Bé. aqueous invert sugar solution amounting to about 1% to about 3% by weight of said dry flux sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

7. A coated arc-welding electrode comprising a core containing about 3.5% to about 5% titanium, about 0.03% to about 0.35% magnesium, up to about 0.75% aluminum, up to about 0.1% carbon and the balance essentially nickel; and a flux coating covering said core containing a dry flux comprising essentially about 42% to about 62% calcium carbonate, about 55% to about 35% cryolite and about 1% to about 5% bentonite, and a binder for said dry flux in said flux coating comprising a baked mixture of sodium silicate in an amount equivalent to a 42.5° Bé. aqueous sodium silicate solution amounting to about 5% to about 30% by weight of said dry flux and invert sugar in an amount equivalent to a 43° Bé. aqueous invert sugar solution in an amount up to about 4% by weight of said dry flux sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

8. A coated arc-welding electrode comprising a core containing about 3.5% to about 5% titanium, about 0.07% to about 0.15% magnesium, up to about 0.75% aluminum, up to about 0.1% carbon and the balance essentially nickel; and a flux coating covering said core containing a dry flux comprising at least about 25% calcium carbonate, at least about 25% cryolite and the balance essentially a small but sufficient amount of bentonite, and an amount of binder sufficient to bind said dry flux as a flux coating on said core; said electrode, when used in the electric-arc fusion deposition of nickel on nickel-clad ferrous metals and on ferrous metals, being capable of producing easily removable slags together with iron-containing fusion deposits possessing improved soundness and ductility.

9. A coated arc welding electrode comprising a core containing about 3.5% to about 5% titanium, about 0.03% to about 0.35% magnesium, about 0.3% to about 0.6% aluminum, up to about 0.1% carbon and the balance essentially nickel; and a flux coating covering said core containing a dry flux comprising at least about 25% calcium carbonate, at least about 25% cryolite, up to about 10% calcium fluoride, up to about 10% sodium fluoride, and the balance essentially a small but sufficient amount of bentonite and an amount of binder sufficient to bind said dry flux as a flux coating on said core; said electrode, when used in the electric-arc fusion deposition of nickel on nickel-clad ferrous metals and on ferrous metals, being capable of providing improved operability and quietness of the arc and rendering the slag more easily removable as compared with a similar electrode not having aluminum in the core in the aforementioned range and said electrode also producing iron-containing fusion deposits possessing improved soundness and ductility.

10. A coated arc-welding electrode comprising a core containing about 3.5% to about 5% titanium, about 0.03% to about 0.35% magnesium, up to about 0.75% aluminum, up to about 0.1% carbon and the balance essentially nickel; and a flux coating covering said core containing a dry flux comprising at least about 25% calcium carbonate, at least about 25% cryolite, up to about 10% calcium fluoride, up to about 10% sodium fluoride and the balance essentially a small but sufficient amount of bentonite, and an amount of binder sufficient to bind said dry flux as a flux coating on said core; said electrode being characterized by enabling the obtaining of iron-containing fusion deposits possessing improved soundness and ductility and having easily removable slags on nickel-clad ferrous metals and on ferrous metals.

11. A coated arc-welding electrode comprising a core containing about 3.5% to about 5% titanium, about 0.03% to about 0.35% magnesium, up to about 0.75% aluminum, up to about 0.1% carbon and the balance essentially nickel; and a flux coating covering said core containing a dry flux comprising at least about 25% calcium carbonate, at least about 25% cryolite, the balance essentially a small but sufficient amount of bentonite, and an amount of binder sufficient to bind said dry flux as a flux coating on said core; said electrode, when used in the electric-arc fusion deposition of nickel on nickel-clad ferrous metals and on ferrous metals, being capable of producing easily removable slags and iron-containing fusion deposits possessing improved soundness and ductility.

References Cited in the file of this patent
UNITED STATES PATENTS

| | | |
|---|---|---|
| 1,920,432 | Pilling et al. | Aug. 1, 1933 |
| 2,048,165 | Pilling et al. | July 21, 1936 |
| 2,213,198 | Bieber | Sept. 3, 1940 |
| 2,303,746 | Kihlgren | Dec. 1, 1942 |
| 2,432,773 | Lee | Dec. 16, 1947 |
| 2,444,654 | Kihlgren | July 6, 1948 |
| 2,504,239 | Roehl | Apr. 18, 1950 |
| 2,512,430 | Kihlgren | June 20, 1950 |
| 2,520,806 | Kihlgren et al. | Aug. 29, 1950 |
| 2,576,123 | Kihlgren | Nov. 27, 1951 |